(12) United States Patent
Hoshiba

(10) Patent No.: US 8,838,319 B2
(45) Date of Patent: Sep. 16, 2014

(54) VEHICLE AND CONTROL METHOD FOR VEHICLE

(75) Inventor: Takeshi Hoshiba, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/990,244

(22) PCT Filed: Dec. 24, 2010

(86) PCT No.: PCT/JP2010/073366
§ 371 (c)(1),
(2), (4) Date: May 29, 2013

(87) PCT Pub. No.: WO2012/086061
PCT Pub. Date: Jun. 28, 2012

(65) Prior Publication Data
US 2013/0261866 A1  Oct. 3, 2013

(51) Int. Cl.
*B60W 10/06* (2006.01)
*B60W 10/18* (2012.01)
*B60W 20/00* (2006.01)
*B60W 30/20* (2006.01)
*B60W 30/18* (2012.01)
*B60K 6/365* (2007.10)
*F02D 29/02* (2006.01)
*B60K 6/445* (2007.10)
*B60W 10/196* (2012.01)
*B60W 10/08* (2006.01)

(52) U.S. Cl.
CPC .......... *B60W 20/40* (2013.01); *B60W 2600/00* (2013.01); *Y02T 10/6286* (2013.01); *B60W 10/18* (2013.01); *Y10S 903/93* (2013.01); *B60W 20/108* (2013.01); *B60W 10/06* (2013.01); *B60W 30/20* (2013.01); *B60W 30/18109* (2013.01); *Y02T 10/6239* (2013.01); *B60K 6/365* (2013.01); *F02D 29/02* (2013.01); *B60K 6/445* (2013.01); *B60W 10/196* (2013.01); *B60W 10/08* (2013.01)
USPC ............................................ 701/22; 903/930

(58) Field of Classification Search
None
See application file for complete search history.

(56) References Cited

U.S. PATENT DOCUMENTS

| 6,488,107 B1 | 12/2002 | Ochiai et al. | |
|---|---|---|---|
| 2007/0149349 A1 | 6/2007 | Utsumi et al. | |
| 2007/0233357 A1 | 10/2007 | Sugai et al. | |
| 2009/0118074 A1* | 5/2009 | Zettel et al. | ........................ 477/3 |
| 2010/0051367 A1* | 3/2010 | Yamada et al. | .......... 180/65.265 |
| 2011/0257824 A1* | 10/2011 | Couchene et al. | .............. 701/22 |

FOREIGN PATENT DOCUMENTS

| JP | A-2001-065385 | 3/2001 |
|---|---|---|
| JP | A-2001-140663 | 5/2001 |
| JP | A-2002-257216 | 9/2002 |
| JP | A-2005-008002 | 1/2005 |
| JP | A-2005-271887 | 10/2005 |
| JP | A-2006-020481 | 1/2006 |
| JP | A-2006-214332 | 8/2006 |

(Continued)

*Primary Examiner* — John R Olszewski
*Assistant Examiner* — Jess Whittington
(74) *Attorney, Agent, or Firm* — Oliff PLC

(57) ABSTRACT

An ECU executes a program including the steps of carrying out fuel cut control when an IG OFF operation is performed and when a vehicle is running, setting a target value Net for an engine rotation speed Ne, carrying out control of a first MG, and ending control of the first MG when a vehicle speed becomes lower than a prescribed vehicle speed.

11 Claims, 7 Drawing Sheets

(56) References Cited

FOREIGN PATENT DOCUMENTS

| JP | A-2007-023919 | 2/2007 |
| JP | A-2007-176421 | 7/2007 |
| JP | A-2008-190495 | 8/2008 |
| JP | A-2010-018212 | 1/2010 |
| JP | A-2010-089619 | 4/2010 |

* cited by examiner

VEHICLE AND CONTROL METHOD FOR VEHICLE

TECHNICAL FIELD

The present invention relates to control of a vehicle incorporating a rotating electric machine and an internal combustion engine.

BACKGROUND ART

According to an engine start control system disclosed in Japanese Patent Laying-Open No. 2007-23919 (PTD 1), a technique for re-starting an engine when a push switch is pressed in spite of absence of pressing down of a brake pedal in the case where the engine stops because of some factor during running of a vehicle is disclosed.

In addition, a hybrid car incorporating a motor generator and an engine has recently attracted attention as one of measures to address environmental issues. For example, a vehicle in which such elements as a drive wheel, an engine, and a motor generator are mechanically coupled to one another has been known as such a hybrid car.

CITATION LIST

Patent Document

PTD 1: Japanese Patent Laying-Open No. 2007-23919

SUMMARY OF INVENTION

Technical Problem

In the hybrid car as described above, when an engine stops because of some factor during running at a high speed, there is a possibility that the engine cannot immediately be re-started. This is because, when rotation of the engine stops, a rotation speed of a motor generator may excessively increase due to mechanical coupling of the elements to one another. When the engine is started with the motor generator under such circumstances, an amount of power generation may increase in the case where the motor generator operates in a power generation region. Here, when charging of a power storage device is not allowed, there is a possibility that the engine cannot be re-started. In addition, during rotation of the motor generator at a high speed, torque necessary for starting the engine cannot be generated, and hence there is a possibility that the engine cannot immediately be re-started.

Regarding the engine start control system disclosed in the publication described above, such a problem is not at all considered and the problem cannot be solved.

An object of the present invention is to provide a vehicle and a control method for vehicle, for controlling an engine to a restartable state when an engine stop instruction is received during running at a high speed.

Solution to Problem

A vehicle according to one aspect of this invention includes a drive shaft for rotating a drive wheel, an internal combustion engine, a first rotating electric machine, a power transmission device capable of transmitting, by mechanically coupling three elements of the drive shaft, an output shaft of the internal combustion engine, and a rotation shaft of the first rotating electric machine and setting any one of the three elements as a reaction force element, motive power between two other elements, an input portion for receiving an instruction for stopping a system of the vehicle from a driver, and a control unit for controlling a braking force application portion such that the vehicle is decelerated when the input portion receives the instruction during running of the vehicle.

Preferably, the control unit controls the internal combustion engine such that fuel injection in the internal combustion engine is stopped when the input portion receives the instruction during running of the vehicle and when the internal combustion engine is operating, and controls the first rotating electric machine such that rotation of the internal combustion engine does not stop by using the first rotating electric machine.

Further preferably, the control unit controls the first rotating electric machine such that rotation of the internal combustion engine in which fuel injection has been stopped does not stop by using the first rotating electric machine until a speed of the vehicle becomes lower than a first speed, and ends control of the first rotating electric machine when the speed of the vehicle becomes lower than the first speed.

Further preferably, the control unit controls the first rotating electric machine such that a rotation speed of the internal combustion engine in which the fuel injection has been stopped attains to a target value.

Further preferably, the vehicle further includes a power storage device for supplying and receiving electric power to and from the first rotating electric machine and a detection portion for detecting a state of charge of the power storage device. The control unit controls the first rotating electric machine such that rotation of the internal combustion engine does not stop by causing the first rotating electric machine to operate within a rotation region in which the first rotating electric machine generates electric power when input electric power allowed in the power storage device is higher than a threshold value.

Further preferably, the vehicle further includes a power storage device for supplying and receiving electric power to and from the first rotating electric machine and a detection portion for detecting a state of charge of the power storage device. The control unit controls the first rotating electric machine such that rotation of the internal combustion engine does not stop by causing the first rotating electric machine to operate within a rotation region in which the first rotating electric machine discharges when input electric power allowed in the power storage device is lower than a threshold value.

Further preferably, the vehicle further includes a second rotating electric machine having a rotation shaft coupled to the drive shaft. The control unit controls the first rotating electric machine and the second rotating electric machine such that balance of electric power between the first rotating electric machine and the second rotating electric machine maintains a zero state in controlling the first rotating electric machine such that rotation of the internal combustion engine does not stop by using the first rotating electric machine.

Further preferably, the vehicle further includes a braking device provided in a motive power transmission path between the drive wheel and the drive shaft, for restricting rotation of the drive wheel. The control unit controls the braking device such that rotation of the drive wheel is restricted when the input portion receives the instruction during running of the vehicle.

Further preferably, the vehicle further includes a second rotating electric machine having a rotation shaft coupled to the drive shaft. The control unit controls the second rotating electric machine such that the vehicle is decelerated by using the second rotating electric machine when the input portion receives the instruction during running of the vehicle.

Further preferably, the control unit controls the braking force application portion such that the vehicle is decelerated when a speed of the vehicle is within a predetermined high vehicle-speed region.

Further preferably, the power transmission device is a planetary gear mechanism having a sun gear, a pinion gear, a carrier, and a ring gear. The sun gear is coupled to the rotation shaft of the first rotating electric machine. The carrier is coupled to the output shaft of the internal combustion engine. The ring gear is coupled to the drive shaft.

A control method for vehicle according to another aspect of this invention is a control method for vehicle used for a vehicle including a drive shaft for rotating a drive wheel, an internal combustion engine, a rotating electric machine, and a power transmission device capable of transmitting, by mechanically coupling three elements of the drive shaft, an output shaft of the internal combustion engine, and a rotation shaft of the rotating electric machine and setting any one of the three elements as a reaction force element, motive power between two other elements. This control method for vehicle includes the steps of receiving an instruction for stopping a system of the vehicle from a driver and controlling a braking force application portion such that the vehicle is decelerated when the instruction is received during running of the vehicle.

Advantageous Effects of Invention

According to this invention, a motor generator entering an overspeed state can be suppressed in the case where an IG OFF operation is performed during running and rotation of an engine is stopped by decelerating a vehicle. In addition, also in the case where the engine is started from such a state that rotation of the engine has stopped, torque necessary for starting the engine can be generated in the motor generator. Therefore, the engine can be stopped when the IG OFF operation is performed during running, and the engine can immediately be re-started when an IG ON operation is performed again. Therefore, a vehicle and a control method for vehicle for controlling an engine to a restartable state in the case where an instruction for stopping the engine is received during running at a high speed can be provided.

DESCRIPTION OF EMBODIMENTS

Figure 1:
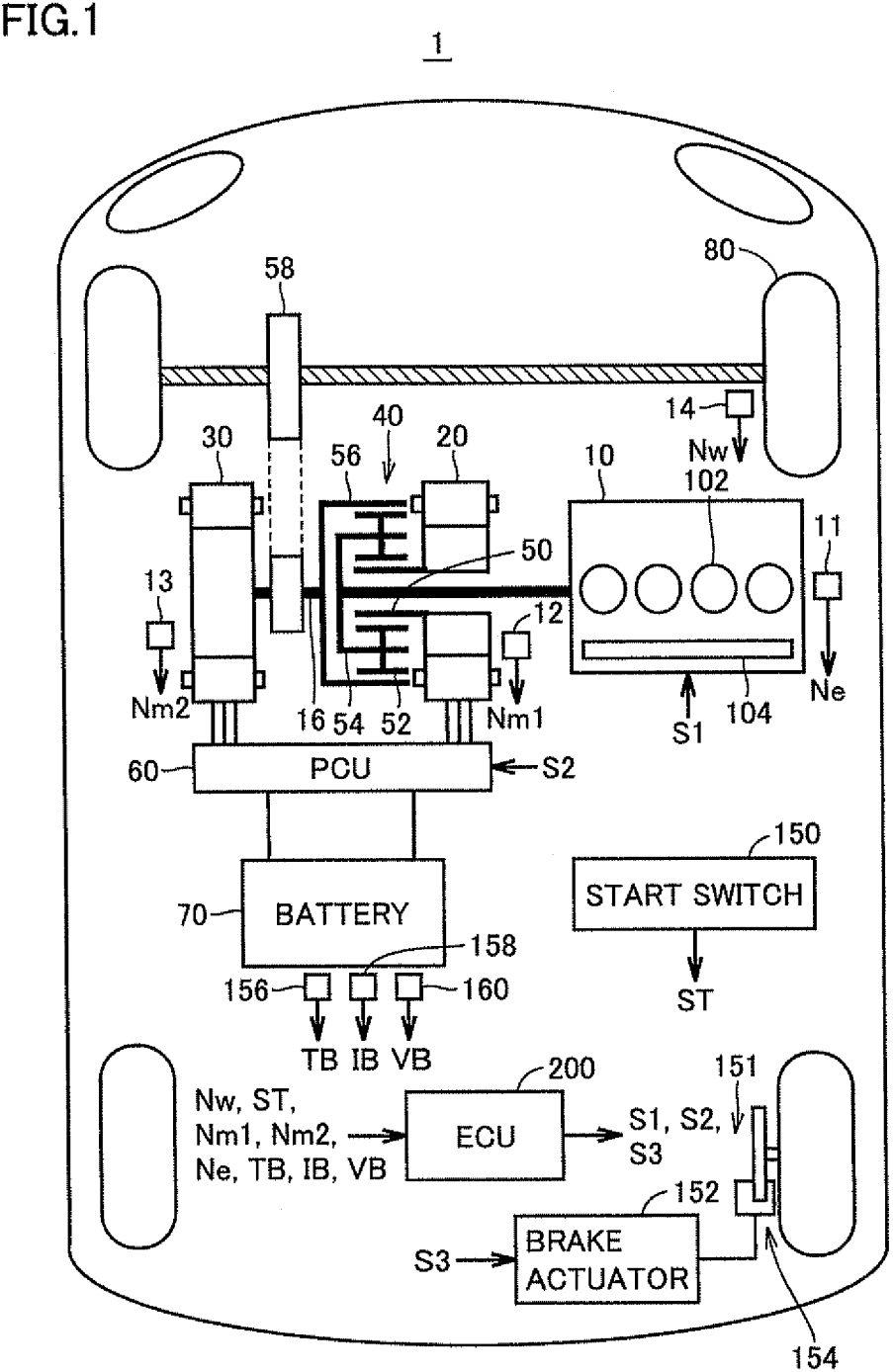
FIG. 1 is an overall block diagram of a vehicle according to a first embodiment.

An embodiment of the present invention will be described hereinafter with reference to the drawings. In the description below, the same elements have the same reference characters allotted. Their label and function are also identical. Therefore, detailed description thereof will not be repeated.

First Embodiment

An overall block diagram of a vehicle 1 according to the present embodiment will be described with reference to FIG. 1. Vehicle 1 includes an engine 10, a drive shaft 16, a first motor generator (hereinafter denoted as a first MG) 20, a second motor generator (hereinafter denoted as a second MG) 30, a power split device 40, a reduction gear 58, a PCU (Power Control Unit) 60, a battery 70, a drive wheel 80, a start switch 150, a braking device 151, and an ECU (Electronic Control Unit) 200.

This vehicle 1 runs with driving force output from at least one of engine 10 and second MG 30. Motive power generated by engine 10 is split into two paths by power split device 40. One path of the two paths is a path for transmission to drive wheel 80 through reduction gear 58, and the other path is a path for transmission to first MG 20.

First MG 20 and second MG 30 are each implemented, for example, by a three-phase AC rotating electric machine. First MG 20 and second MG 30 are driven by PCU 60.

First MG 20 has a function as a generator for generating electric power with motive power of engine 10 split by power split device 40 and for charging battery 70 with electric power through PCU 60. In addition, first MG 20 rotates a crankshaft which is an output shaft of engine 10, upon receiving electric power from battery 70. Thus, first MG 20 has a function as a starter for starting engine 10.

Second MG 30 has a function as a drive motor for providing driving force to drive wheel 80 by using at least any one of electric power stored in battery 70 and electric power generated by first MG 20. In addition, second MG 30 has a function as a generator for charging battery 70 through PCU 60 with electric power generated through regenerative braking.

Engine 10 is, for example, such an internal combustion engine as a gasoline engine or a diesel engine. Engine 10 includes a plurality of cylinders 102 and a fuel injector 104 for supplying fuel to each of the plurality of cylinders 102. Fuel injector 104 injects an appropriate amount of fuel at appropriate timing to each cylinder or stops injection of fuel to each cylinder based on a control signal S1 from ECU 200.

Engine 10 is provided with an engine rotation speed sensor 11 for detecting a rotation speed Ne of a crankshaft of engine 10 (hereinafter denoted as an engine rotation speed). Engine rotation speed sensor 11 transmits a signal indicating detected engine rotation speed Ne to ECU 200.

Power split device 40 mechanically couples three elements of drive shaft 16 for rotating drive wheel 80, the output shaft of engine 10, and a rotation shaft of first MG 20 to one another. Power split device 40 allows, by setting any one of the three elements described above as a reaction force element, transmission of motive power between two other elements. A rotation shaft of second MG 30 is coupled to drive shaft 16.

Power split device 40 is a planetary gear mechanism including a sun gear 50, a pinion gear 52, a carrier 54, and a ring gear 56. Pinion gear 52 engages with each of sun gear 50 and ring gear 56. Carrier 54 rotatably supports pinion gear 52 and it is coupled to the crankshaft of engine 10. Sun gear 50 is coupled to the rotation shaft of first MG 20. Ring gear 56 is coupled to the rotation shaft of second MG 30 and reduction gear 58 with drive shaft 16 being interposed.

Reduction gear 58 transmits motive power from power split device 40 or second MG 30 to drive wheel 80. In addition, reduction gear 58 transmits reaction force from a road surface received by drive wheel 80 to power split device 40 or second MG 30.

PCU 60 converts DC power stored in battery 70 into AC power for driving first MG 20 and second MG 30. PCU 60 includes a converter and an inverter (neither of which is shown) controlled based on a control signal S2 from ECU 200. The converter steps up a voltage of DC power received from battery 70 and outputs the resultant voltage to the inverter. The inverter converts DC power output by the converter to AC power and outputs the resultant AC power to first MG 20 and/or second MG 30. Thus, first MG 20 and/or second MG 30 is/are driven by electric power stored in battery 70. In addition, the inverter converts AC power generated by first MG 20 and/or second MG 30 into DC power and outputs the resultant DC power to the converter. The converter steps down a voltage of the DC power output by the inverter and outputs the resultant voltage to battery 70. Thus, battery 70 is charged with electric power generated by first MG 20 and/or second MG 30. It is noted that it is not necessary to provide a converter.

Battery 70 is a power storage device and it is a rechargeable DC power supply. For example, such a secondary battery as a nickel metal hydride battery or a lithium ion battery is employed as battery 70. A voltage of battery 70 is, for example, approximately 200 V. As described above, battery 70 is charged with electric power generated by first MG 20 and/or second MG 30 and it may be charged with electric power supplied from an external power supply (not shown). It is noted that battery 70 is not limited to a secondary battery and it may be a component capable of generating a DC voltage, such as a capacitor, a solar cell, and a fuel cell.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. Start switch 150 may be such a switch that a key is inserted in a key cylinder and turned to a prescribed position. Start switch 150 is connected to ECU 200. In response to a driver's operation of start switch 150, start switch 150 transmits a signal ST to ECU 200.

For example, when ECU 200 receives signal ST while a system of vehicle 1 has stopped, ECU 200 determines that it has received an activation instruction and causes the system of vehicle 1 to make transition from a stop state to an active state. Alternatively, when ECU 200 receives signal ST while the system of vehicle 1 is in an active state, ECU 200 determines that it has received a stop instruction and causes the system of vehicle 1 to make transition from the active state to the stop state. In the description below, a driver's operation of start switch 150 while the system of vehicle 1 is in the active state is referred to as an IG OFF operation, and a driver's operation of start switch 150 while the system of vehicle 1 is in the stop state is referred to as an IG ON operation. When the system of vehicle 1 makes transition to the active state, electric power is supplied to a plurality of pieces of equipment necessary for vehicle 1 to run or the like and an operable state is set. On the other hand, when the system of vehicle 1 makes transition to the stop state, supply of electric power to some of the plurality of pieces of equipment necessary for vehicle 1 to run is stopped or the like and an operation stop state is set.

A first resolver 12 detects a rotation speed Nm1 of first MG 20. First resolver 12 transmits a signal indicating detected rotation speed Nm1 to ECU 200. A second resolver 13 detects a rotation speed Nm2 of second MG 30. Second resolver 13 transmits a signal indicating a detected rotation speed Nm2 to ECU 200.

A wheel speed sensor 14 detects a rotation speed Nw of drive wheel 80. Wheel speed sensor 14 transmits a signal indicating detected rotation speed Nw to ECU 200. ECU 200 calculates a vehicle speed V based on received rotation speed Nw. It is noted that ECU 200 may calculate vehicle speed V based on rotation speed Nm2 of second MG 30 instead of rotation speed Nw.

Braking device 151 includes a brake actuator 152 and a disk brake 154. Disk brake 154 includes a brake disk that rotates integrally with a wheel and a brake caliper for restricting rotation of the brake disk by using a hydraulic pressure. The brake caliper includes brake pads provided to sandwich the brake disk in a direction in parallel to the rotation shaft and a wheel cylinder for transmitting a hydraulic pressure to the brake pad. Brake actuator 152 regulates a hydraulic pressure supplied to the wheel cylinder by regulating a hydraulic pressure generated by the driver's pressing-down of the brake pedal and a hydraulic pressure generated by using a pump, an electromagnetic valve, and the like, based on a control signal S3 received from ECU 200. Though FIG. 1 shows braking device 151 only on the right of a rear wheel, braking device 151 is provided for each wheel.

ECU 200 generates control signal S1 for controlling engine 10 and outputs generated control signal S1 to engine 10. In addition, ECU 200 generates control signal S2 for controlling PCU 60 and outputs generated control signal S2 to PCU 60. Furthermore, ECU 200 generates control signal S3 for controlling brake actuator 152 and outputs generated control signal S3 to brake actuator 152.

By controlling engine 10, PCU 60, and the like, ECU 200 controls the entire hybrid system, that is, a state of charge and discharge of battery 70, and an operation state of engine 10, first MG 20, and second MG 30, such that vehicle 1 can most efficiently operate.

ECU 200 calculates requested driving force corresponding to an amount of pressing-down of an accelerator pedal (not shown) provided in a driver's seat. ECU 200 controls torque of first MG 20 and second MG 30 and output of engine 10 in accordance with calculated requested driving force.

In vehicle 1 having the features as described above, when efficiency of engine 10 is bad at the time of start, during running at a low speed, or the like, running only with second MG 30 is carried out. Alternatively, during normal running, for example, power split device 40 splits motive power of engine 10 into two paths for motive power. Drive wheel 80 is directly driven by one motive power. Electric power is generated by driving first MG 20 with the other motive power. Here, ECU 200 causes second MG 30 to drive with the use of generated electric power. By thus driving second MG 30, drive of drive wheel 80 is assisted.

During deceleration of vehicle 1, second MG 30 following rotation of drive wheel 80 functions as a generator so that regenerative braking is carried out. Electric power recovered in regenerative braking is stored in battery 70. It is noted that ECU 200 increases an amount of electric power generated by first MG 20 by increasing output of engine 10 in the case where a remaining capacity of the power storage device (in the description below, denoted as SOC (State of Charge)) has lowered and charging is particularly required. SOC of battery 70 is thus raised. In addition, ECU 200 may carry out control for increasing driving force from engine 10 as necessary, even during running at a low speed. For example, a case where charging of battery 70 is required as described above, a case where auxiliary machinery such as an air-conditioner is driven, a case where a temperature of a coolant for engine 10 is raised to a prescribed temperature, and the like are exemplified.

In controlling an amount of charging of battery 70 and an amount of discharge therefrom, ECU 200 sets input electric power allowed during charging of battery 70 (in the description below, denoted as "charge power upper limit Win") and output electric power allowed during discharging from battery 70 (in the description below, denoted as "discharge power upper limit Wout") based on battery temperature TB and current SOC. For example, as the current SOC lowers, discharge power upper limit Wout is set to gradually lower. On the other hand, as the current SOC is higher, charge power upper limit Win is set to gradually lower.

A secondary battery employed as battery 70 has such temperature dependence that internal resistance increases when the temperature is low. When the temperature is high, excessive increase in temperature due to further heat generation should be prevented. Therefore, when battery temperature TB is low and high, each of discharge power upper limit Wout and charge power upper limit Win is preferably lowered. ECU 200 sets charge power upper limit Win and discharge power upper limit Wout, for example, by using a map or the like, in accordance with battery temperature TB and current SOC.

In vehicle 1 having the features described above, when engine 10 stops because of some factor during running at a high speed, there is a case that the engine cannot immediately be re-started. For example, as shown with a solid line in a nomographic chart in FIG. 2, a case where vehicle 1 runs at a high speed is assumed.

Figure 2:
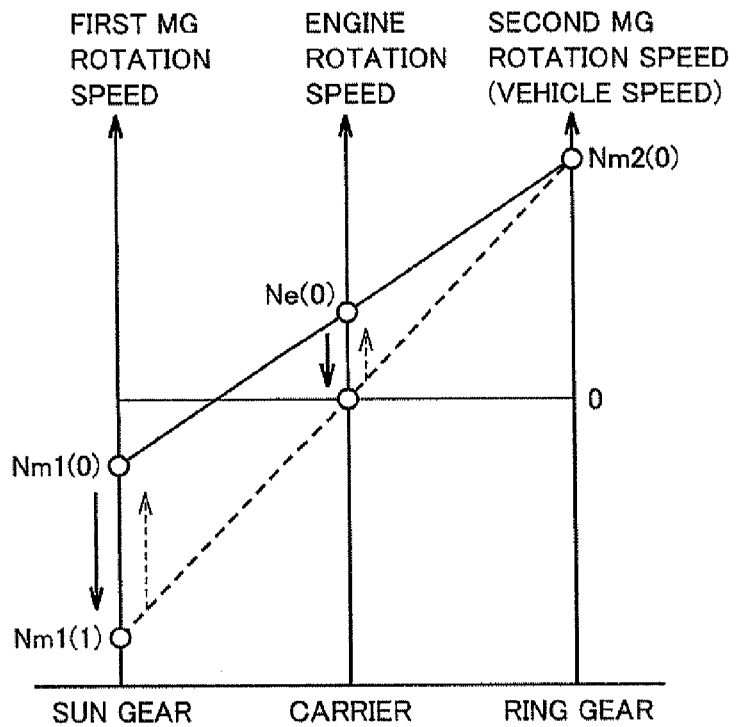
FIG. 2 is a nomographic chart (No. 1) for illustrating an operation of the vehicle in the first embodiment.

It is noted that a vertical axis on the left among three vertical axes in the nomographic chart shown in FIG. 2 represents a rotation speed of sun gear 50, that is, rotation speed Nm1 of first MG 20. In addition, a central vertical axis in the nomographic chart shown in FIG. 2 represents a rotation speed of carrier 54, that is, engine rotation speed Ne. Moreover, a vertical axis on the right in the nomographic chart shown in FIG. 2 represents a rotation speed of ring gear 56, that is, rotation speed Nm2 of second MG 30. It is noted that a direction shown with an arrow along each vertical axis in the nomographic chart in FIG. 2 indicates a positive rotation direction and a direction reverse to the direction shown with the arrow indicates a negative rotation direction.

During running of vehicle 1, rotation speed Nm1 of first MG 20, engine rotation speed Ne, and rotation speed Nm2 of second MG 30 vary such that rotation speeds Nm1, Ne, Nm2 of respective elements maintain relation connected to one another through one straight line in the nomographic chart in FIG. 2.

As shown with the solid line in FIG. 2, it is assumed that rotation speed Nm1 of first MG 20 is set to Nm1(0), engine rotation speed Ne is set to Ne(0), and rotation speed Nm2 of second MG 30 is set to Nm2(0).

When fuel injection into engine 10 is stopped in the case where an IG OFF operation is performed during running of vehicle 1 at a high speed, engine rotation speed Ne lowers to zero. Here, as shown with a dashed line in FIG. 2, rotation speed Nm1 of first MG 20 increases in the negative rotation direction from Nm1(0) to Nm1(1). Therefore, as a speed of vehicle 1 is higher, rotation speed Nm1 of first MG 20 in the case where engine rotation speed Ne attains to zero (in the case where rotation of engine 10 stops) may excessively increase.

In addition, a case where engine 10 is started by using first MG 20 when engine rotation speed Ne is zero is assumed. In this case, engine rotation speed Ne should be increased by raising rotation speed Nm1 of first MG 20 from Nm1(1) (the dashed line in FIG. 2) to Nm1(0) (the solid line in FIG. 2).

When vehicle 1 runs at a high speed, however, rotation speed Nm1 of first MG 20 becomes high in the negative rotation direction. Therefore, there is a case that torque in the positive rotation direction for increasing engine rotation speed Ne cannot be generated.

Furthermore, in order to increase the rotation speed of first MG 20 from Nm1(1) to Nm1(0), torque in the positive rotation direction opposite to a rotation direction (negative rotation direction) of first MG 20 should be generated. Therefore, first MG 20 may generate electric power in a process for increasing the rotation speed of first MG 20 from Nm1(1) to Nm1(0). When charge power upper limit Win has lowered due to such a factor as high SOC of battery 70, low battery temperature TB, or high battery temperature TB, there is a case that the rotation speed of first MG 20 cannot be increased.

Therefore, when the IG OFF operation is performed during running of the vehicle at a high speed, there is a case that rotation of engine 10 cannot be stopped or engine 10 cannot immediately be started.

Then, the present embodiment is characterized in that ECU 200 controls a braking force application portion such that vehicle 1 is decelerated when start switch 150 receives a stop instruction during running of vehicle 1. In the present embodiment, the braking force application portion includes engine 10 and first MG 20. ECU 200 controls first MG 20 and engine 10 such that torque in the positive rotation direction and torque based on frictional resistance force (engine brake) of engine 10 are generated in first MG 20. As the generated torque generates torque in the negative rotation direction of second MG 30, vehicle 1 is decelerated.

Specifically, when the stop instruction is received during running of vehicle 1 and when engine 10 is operating, ECU 200 controls engine 10 such that fuel injection in engine 10 is stopped (hereinafter such control being denoted as fuel cut control). In addition, ECU 200 carries out fuel cut control and controls first MG 20 such that rotation of engine 10 does not stop, by using first MG 20. Moreover, ECU 200 controls first MG 20 until vehicle speed V becomes lower than a prescribed vehicle speed V(0), and ends control of first MG 20 when vehicle speed V becomes lower than prescribed vehicle speed V(0).

It is noted that prescribed vehicle speed V(0) refers, for example, to such a vehicle speed that first MG 20 or pinion gear 52 enters an overspeed state when engine rotation speed Ne attains to zero.

Figure 3:
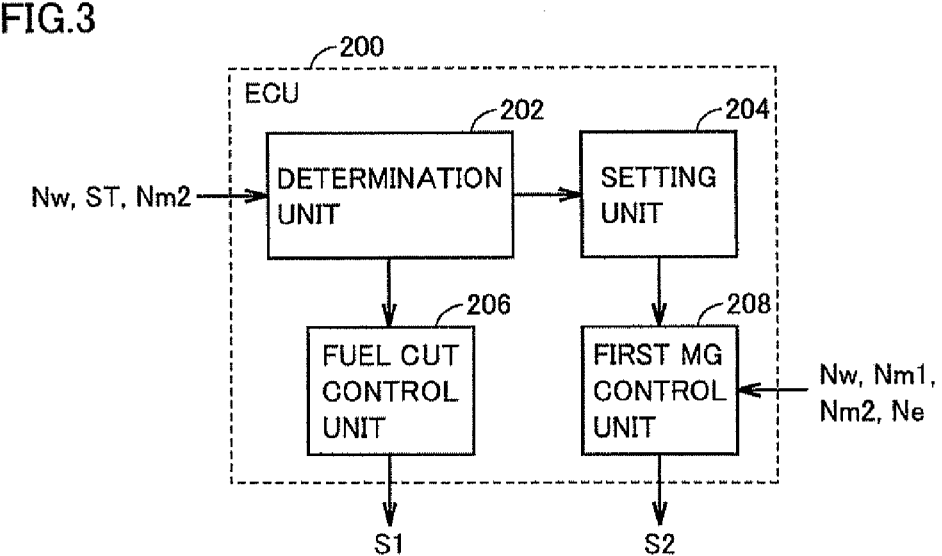
FIG. 3 is a functional block diagram of an ECU mounted on the vehicle according to the first embodiment.

FIG. 3 shows a functional block diagram of ECU 200 mounted on vehicle 1 according to the present embodiment. ECU 200 includes a determination unit 202, a setting unit 204, a fuel cut control unit 206, and a first MG control unit 208.

Determination unit 202 determines whether or not an IG OFF operation has been performed. When signal ST is received from start switch 150 with a system of vehicle 1 being active, determination unit 202 determines that the IG OFF operation has been performed. It is noted that determination unit 202 may turn on an IG OFF determination flag, for example, when the IG OFF operation is performed.

In addition, determination unit 202 determines whether or not vehicle 1 is running. When vehicle speed V is higher than prescribed vehicle speed V(0), determination unit 202 determines that vehicle 1 is running. It is noted that determination unit 202 may turn on a running determination flag when vehicle 1 is determined as running.

When determination unit 202 determines that the IG OFF operation has been performed and vehicle 1 is running, setting unit 204 sets a target value Net for engine rotation speed Ne while fuel cut control is being carried out.

Setting unit 204 sets as target value Net, for example, a rotation speed higher than a lowest rotation speed of engine 10 at which first explosion of engine 10 can take place. In addition, setting unit 204 sets as target value Net, a rotation speed higher than a lowest rotation speed of engine 10 at which first MG 20 or pinion gear 52 does not enter an overspeed state (that is, at which rotation speed Nm1 of first MG 20 is higher than a threshold value serving as a criterion for determination of an overspeed state). Furthermore, setting unit 204 sets target value Net such that rotation speed Nm1 of first MG 20 is within a rotation region in which torque necessary for raising engine rotation speed Ne can be generated. It is noted that setting unit 204 may set target value Net for engine rotation speed Ne, for example, when both of the IG OFF determination flag and the running determination flag are ON.

Setting unit 204 may set target value Net in accordance with a current vehicle speed V. For example, when vehicle speed V is higher than a prescribed vehicle speed V(1) (>V (0)), setting unit 204 may set target value Net such that, as vehicle speed V is higher, target value Net is higher. Alternatively, when vehicle V is equal to or lower than prescribed vehicle speed V(1), setting unit 204 may set certain target value Net in consideration of the lowest rotation speed of engine 10 described above, a rotation speed of engine 10 at which necessary torque can be generated in first MG 20, or the like.

By setting higher target value Net as vehicle speed V is higher, deceleration force generated by engine brake can be greater than in the case where vehicle speed V is low. In addition, setting unit 204 may set target value Net, for example, in accordance with a slope of a road surface. Setting unit 204 may set target value Net, for example, such that, as a road surface on which vehicle 1 runs is a descending slope, target value Net is higher.

When determination unit 202 determines that the IG OFF operation has been performed and vehicle 1 is running, fuel cut control unit 206 carries out fuel cut control for stopping fuel injection into a cylinder. Fuel cut control unit 206 generates control signal S1 indicating that fuel cut control be carried out and transmits generated control signal S1 to engine 10. It is noted that fuel cut control unit 206 may carry out fuel cut control, for example, when both of the IG OFF determination flag and the running determination flag are ON. In addition, fuel cut control unit 206 may stop fuel injection into cylinder 102 by not transmitting control signal S1 to engine 10.

First MG control unit 208 controls first MG 20 such that rotation of engine 10 does not stop. Namely, first MG control unit 208 carries out feedback control of first MG 20 such that engine rotation speed Ne attains to target value Net set by setting unit 204. First MG control unit 208 generates a torque command value, for example, based on a difference between current engine rotation speed Ne and target value Net, and controls first MG 20 such that torque in accordance with the generated torque command value is generated. It is noted that, preferably, feedback gain is desirably set such that an amount of change in vehicle speed V is within a range from an upper limit value to a lower limit value. For example, the upper limit value may be set by adapting through experiments or the like, a maximum value for an amount of change to such an extent that a driver does not feel sudden generation of deceleration force. Alternatively, the lower limit value may be set by adapting through experiments or the like, a minimum value for an amount of change in the case where a period from the IG OFF operation performed until vehicle speed V becoming lower than prescribed vehicle speed V(0) at which control of first MG 20 ends is performed for a prescribed period.

When engine rotation speed Ne has attained to target value Net, first MG control unit 208 continues feedback control until vehicle speed V becomes lower than prescribed vehicle speed V(0) and controls first MG 20 such that engine rotation speed Ne is maintained at target value Net. When it is determined that vehicle speed V has become lower than prescribed vehicle speed V(0), first MG control unit 208 ends control of first MG 20.

In the present embodiment, determination unit 202, setting unit 204, fuel cut control unit 206, and first MG control unit 208 are each described as functioning as software implemented by execution by a CPU in ECU 200, of a program stored in a memory, however, they may be implemented by hardware. It is noted that such a program is mounted on a vehicle as recorded in a storage medium.

A control structure of a program executed by ECU 200 mounted on vehicle 1 according to the present embodiment will be described with reference to FIG. 4.

In step (a step will hereinafter be denoted as S) 100, ECU 200 determines whether or not an IG OFF operation has been performed. When the IG OFF operation has been performed (YES in S100), the process proceeds to S102. Otherwise (NO in S100), the process returns to S100.

In S102, ECU 200 determines whether or not vehicle 1 is running. When vehicle speed V of vehicle 1 is equal to or higher than prescribed vehicle speed V(0), ECU 200 determines that vehicle 1 is running. When vehicle 1 is running (YES in S102), the process proceeds to S104. Otherwise (NO in S102), the process returns to S100.

In S104, ECU 200 carries out fuel cut control. In S106, ECU 200 sets target value Net for engine rotation speed Ne. Since an operation for setting target value Net is similar to the operation of setting unit 204 described above, detailed description thereof will not be repeated. In S108, ECU 200 controls first MG 20 such that engine rotation speed Ne attains to target value Net. Since an operation for controlling first MG 20 is similar to the operation of first MG control unit 208 described above, detailed description thereof will not be repeated.

In S110, ECU 200 determines whether or not vehicle speed V has become lower than prescribed vehicle speed V(0). When vehicle speed V has become lower than prescribed vehicle speed V(0) (YES in S110), the process proceeds to S112. Otherwise (NO in S110), the process returns to S108. In S112, ECU 200 ends control of first MG 20.

An operation of ECU 200 mounted on vehicle 1 according to the present embodiment based on the structure and the flowchart as above will be described with reference to the nomographic chart in FIG. 5. Since an element showing each axis in the nomographic chart is similar to that in the nomographic chart in FIG. 2, detailed description thereof will not be repeated. In addition, in the nomographic chart in FIG. 5, for the sake of convenience of illustration, rotation speed Nm1 of first MG 20, engine rotation speed Ne, and rotation speed Nm2 of second MG 30 are described as if they sequentially varied. Therefore, though engine rotation speed Ne exhibits such change as overshooting target value Net in the description below, rotation speed Nm1 of first MG 20, engine rotation speed Ne, and rotation speed Nm2 of second MG 30 actually vary simultaneously in parallel, and therefore change is not particularly limited to change shown in the nomographic chart in FIG. 5. Namely, there is also a case that engine rotation speed Ne reaches target value Net without overshooting.

Figure 5:
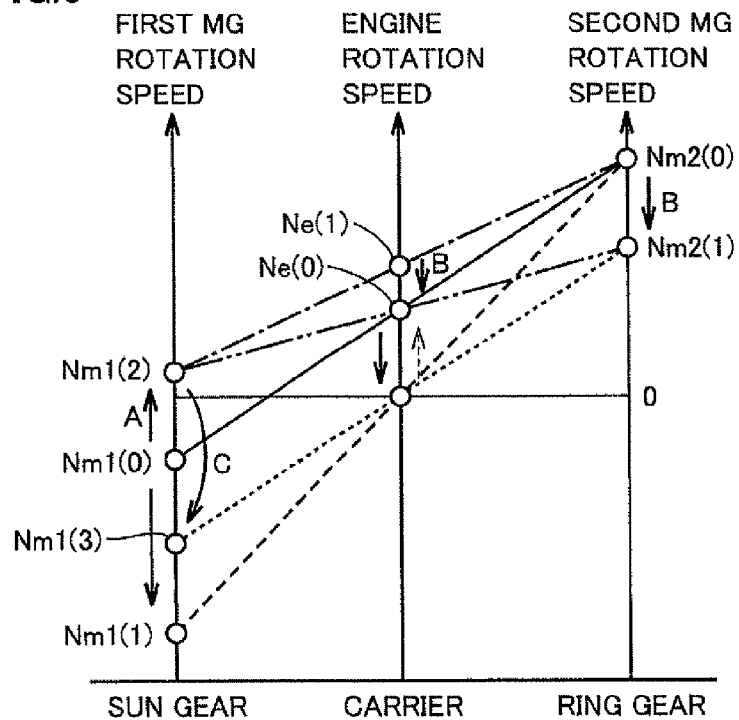
FIG. 5 is a nomographic chart (No. 2) for illustrating an operation of the vehicle in the first embodiment.

As shown with a solid line in FIG. 5, it is assumed that rotation speed Nm1 of first MG 20 is set to Nm1(0), engine rotation speed Ne is set to Ne(0), and rotation speed Nm2 of second MG 30 is set to Nm2(0).

When an IG OFF operation is performed during running of vehicle 1 at a high speed (YES in S100, YES in S102), fuel cut control is carried out (S104) and target value Net for engine rotation speed Ne is set (S106). First MG 20 is controlled such that engine rotation speed Ne attains to target value Net (S108). In the description below, for example, target value Net is assumed as being a value equal to Ne(0).

As shown with alternate long and short dashed lines in FIG. 5, first MG 20 is controlled such that rotation speed Nm1 of first MG 20 is raised from Nm1(0) to Nm1(2). Here, torque in the positive rotation direction is generated in first MG 20. Engine rotation speed Ne is raised up to Ne(1) owing to the torque generated in first MG 20. Here, torque in a direction of deceleration of vehicle 1 (the negative rotation direction of second MG 30) is applied to ring gear 56 by the torque generated in first MG 20 and torque resulting from engine brake of engine 10. Therefore, as shown with a chain double dotted line in FIG. 5, rotation speed Nm2 of second MG 30 is lowered from Nm2(0) to Nm2(1). Namely, vehicle 1 is decelerated. Here, when engine rotation speed Ne reaches target value Net, engine rotation speed Ne is maintained. Thereafter, when vehicle speed V becomes lower than prescribed vehicle speed V(0) (YES in S110), control of first MG 20 ends (S112).

Thus, by making vehicle speed V lower than prescribed vehicle speed V(0), for example, when rotation of engine 10 is stopped as shown with a short dashed line in FIG. 5, rotation speed Nm1 of first MG 20 attains to Nm1(3) lower in rotation speed in the negative rotation direction than Nm1(1) shown with a long dashed line in FIG. 5. Therefore, even though rotation of engine 10 is stopped when the IG OFF operation is performed during running, first MG 20 or pinion gear 52 entering the overspeed state is suppressed. It is noted that Nm1(1) indicates rotation speed Nm1 of first MG 20 at the time when rotation of engine 10 is stopped without lowering vehicle speed V in the case where the IG OFF operation is performed during running.

In addition, by making vehicle speed V lower than prescribed vehicle speed V(0), the rotation speed in the negative rotation direction of first MG 20 becomes lower than in the case where vehicle speed V is equal to or higher than prescribed vehicle speed V(0). Therefore, rotation speed Nm1 of first MG 20 is within a rotation region in which torque necessary for starting engine 10 can be generated.

As above, according to the vehicle in the present embodiment, first MG 20 or pinion gear 52 entering an overspeed state can be suppressed in the case where an IG OFF operation is performed during running and rotation of engine 10 is stopped by decelerating vehicle 1. In addition, also in the case where engine 10 is started from such a state that rotation of engine 10 has stopped, torque necessary for starting engine 10 can be generated in first MG 20. Therefore, engine 10 can be stopped when the IG OFF operation is performed during running, and engine 10 can immediately be re-started when the IG ON operation is performed again. Therefore, a vehicle and a control method for vehicle for controlling an engine to a restartable state in the case where an instruction for stopping the engine is received during running at a high speed can be provided.

Though vehicle 1 having drive wheel 80 as a front wheel has been shown by way of example in FIG. 1, the vehicle is not particularly limited to such a drive system. For example, vehicle 1 may have a rear wheel as a drive wheel. Alternatively, vehicle 1 may be a vehicle not including second MG 30 in FIG. 1. Alternatively, vehicle 1 may be a vehicle in which second MG 30 in FIG. 1 is coupled to a drive shaft for driving a rear wheel instead of drive shaft 16 of a front wheel. In addition, a speed change mechanism may be provided between drive shaft 16 and reduction gear 58 or between drive shaft 16 and second MG 30.

Though ECU 200 in FIG. 1 has been described as a single ECU, two or more ECUs may be employed. For example, an operation of ECU 200 in FIG. 1 may be allocated to an engine ECU for controlling engine 10 and a hybrid ECU for controlling PCU 60.

In addition, though description has been given in the present embodiment assuming that vehicle 1 is decelerated by the torque in the positive rotation direction in first MG 20 and the torque resulting from the engine brake generated in engine 10, a method of decelerating vehicle 1 is not particularly limited thereto.

Namely, the braking force application portion may be implemented by braking device 151. For example, by restricting rotation of each wheel by controlling brake actuator 152 such that a hydraulic pressure supplied to a wheel cylinder of each wheel increases in the case where the IG OFF operation is performed during running of vehicle 1, deceleration may be carried out until vehicle speed V of vehicle 1 becomes lower than prescribed vehicle speed V(0).

Alternatively, the braking force application portion may be implemented by second MG 30. For example, by generating torque in the negative rotation direction in second MG 30 (by carrying out regenerative braking) in the case where the IG OFF operation is performed during running of vehicle 1, deceleration may be carried out until vehicle speed V of vehicle 1 becomes lower than prescribed vehicle speed V(0).

Though description has been given in the present embodiment assuming that control for decelerating vehicle 1 (control of first MG 20, the brake actuator, or second MG 30) ends when vehicle speed V of vehicle 1 becomes lower than prescribed vehicle speed V(0), for example, control for decelerating vehicle 1 may be continued until vehicle 1 stops. In particular in the case where control for decelerating vehicle 1 with engine brake is continued by using first MG 20, an engine rotation speed at which first explosion can take place is maintained. Therefore, by injecting fuel at the time when a request to start engine 10 is received, engine 10 can quickly be re-started.

Furthermore, power fluctuation caused by generation of torque in the positive rotation direction in first MG 20 at the time when the IG OFF operation is performed during running of vehicle 1 may be accommodated by generating torque in the negative rotation direction or torque in the positive rotation direction in second MG 30. Namely, ECU 200 may control first MG 20 and second MG 30 such that balance of electric power between the first MG and the second MG maintains a zero state in controlling first MG 20 such that rotation of engine 10 does not stop. Thus, input and output of electric power to and from battery 70 can be suppressed. ECU 200 may carry out control described above, for example, when such a prescribed condition is satisfied that vehicle 1 can be decelerated to prescribed vehicle speed V(0) within a prescribed period even though balance of electric power is maintained in the zero state. The prescribed condition refers, for example, to such a condition that vehicle 1 is running on a road surface of an ascending slope.

Alternatively, ECU 200 may decelerate vehicle 1 while a speed of vehicle 1 is in a predetermined high vehicle-speed region in the case where the IG OFF operation is performed during running of vehicle 1. The predetermined high vehicle-speed region refers, for example, to a speed region in which first MG 20 enters an overspeed state when rotation of engine 10 stops.

Alternatively, ECU 200 may continue control for decelerating vehicle 1 from the IG OFF operation performed until lapse of a prescribed time period in the case where the IG OFF operation is performed during running of vehicle 1.

Second Embodiment

A vehicle according to a second embodiment will be described hereinafter. The vehicle according to the present embodiment is different from features of vehicle 1 according to the first embodiment described above in operation of ECU 200. Features are otherwise the same as those of vehicle 1 according to the first embodiment described above and those have the same reference characters allotted. Their functions are also identical. Therefore, detailed description thereof will not be repeated here.

Figure 6:
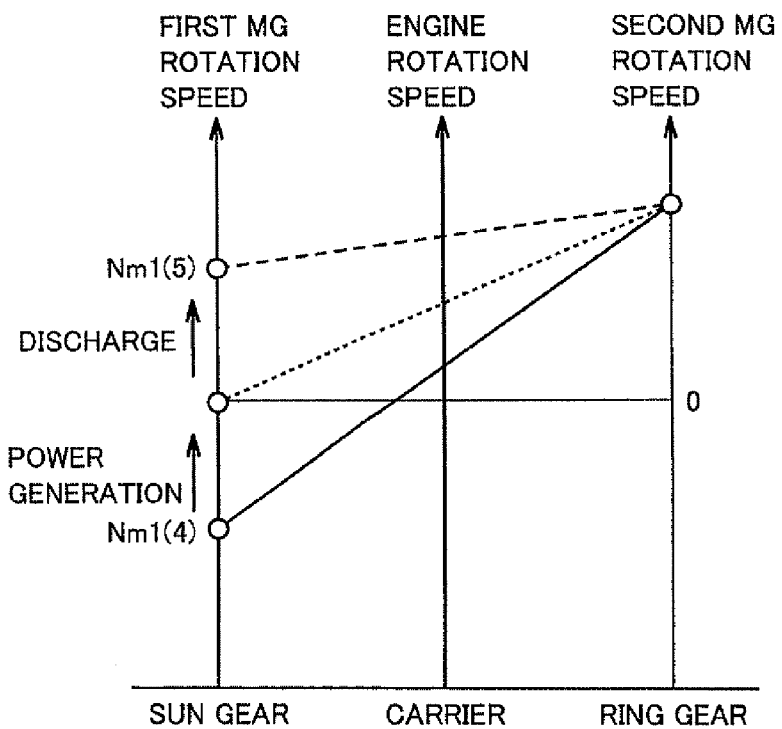
FIG. 6 is a nomographic chart (No. 3) for illustrating an operation of the vehicle in the first embodiment.

As shown in a nomographic chart in FIG. 6, for example, in the case where rotation speed Nm1 of first MG 20 is raised from Nm1(4) (a solid line in FIG. 6) to zero (a short dashed line in FIG. 6), a direction of rotation of first MG 20 and an orientation of torque are reverse to each other and hence first MG 20 generates electric power.

On the other hand, for example, in the case where rotation speed Nm1 of first MG 20 is raised from zero to Nm1(5) (a long dashed line in FIG. 6), the direction of rotation of first MG 20 and the orientation of torque are the same and hence first MG 20 discharges.

Thus, depending on a rotation region of first MG 20, first MG 20 generates electric power or discharges. On the other hand, as SOC of battery 70 is higher or as battery temperature TB of battery 70 is lower or higher, charge power upper limit Win lowers and charging of battery 70 may be restricted. Alternatively, as SOC of battery 70 is lower or battery temperature TB of battery 70 is within a range of a room temperature, charge power upper limit Win increases and restriction on charging of battery 70 may be relaxed.

Then, in the present embodiment, when an IG OFF operation is performed during running of vehicle 1 and when input electric power allowed in battery 70 is lower than a first threshold value, ECU 200 controls first MG 20 such that rotation of engine 10 does not stop, by causing first MG 20 to operate within a rotation region where first MG 20 discharges. When the IG OFF operation is performed during running of vehicle 1 and when input electric power allowed in battery 70 is higher than a second threshold value, ECU 200 controls the first MG 20 such that rotation of engine 10 does not stop, by causing first MG 20 to operate within a rotation region where first MG 20 generates electric power.

Specifically, when the IG OFF operation is performed during running of vehicle 1 and when SOC of battery 70 is higher than a threshold value SOC(0), ECU 200 controls first MG 20 such that rotation of engine 10 does not stop in the rotation region where first MG 20 discharges.

When the IG OFF operation is performed during running of vehicle 1 and when SOC of battery 70 is lower than a threshold value SOC(1), ECU 200 controls first MG 20 such that rotation of engine 10 does not stop in the rotation region where first MG 20 generates electric power.

It is noted that a case where SOC of battery 70 is higher than threshold value SOC(0) corresponds to a case where input electric power allowed in battery 70 is lower than the first threshold value. A case where SOC of battery 70 is lower than threshold value SOC(1) corresponds to a case where input electric power allowed in battery 70 is higher than the second threshold value.

In the description below, the rotation region where first MG 20 generates electric power is denoted as a power generation region, and the rotation region where first MG 20 discharges is denoted as a discharge region.

Figure 7:
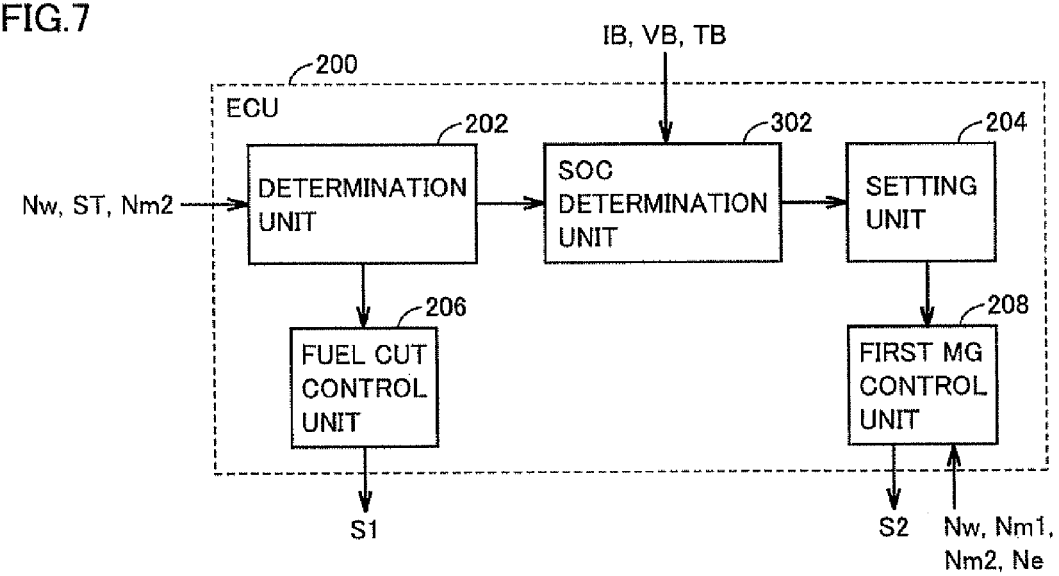
FIG. 7 is a functional block diagram of an ECU mounted on the vehicle according to a second embodiment.

FIG. 7 shows a functional block diagram of ECU 200 mounted on vehicle 1 according to the present embodiment. It is noted that the functional block diagram of ECU 200 shown in FIG. 7 is different from the functional block diagram of ECU 200 shown in FIG. 3 in an operation of setting unit 204, an operation of first MG control unit 208, and an SOC determination unit 302 further included in ECU 200. Features and operations thereof are otherwise the same as those in the functional block diagram of ECU 200 discussed in the first embodiment described above. Therefore, detailed description thereof will not be repeated here.

SOC determination unit 302 estimates SOC based on battery temperature TB, current IB, and voltage VB. For example, SOC determination unit 302 estimates an internal resistance having characteristics dependent on battery temperature TB, based on battery temperature TB, estimates an open circuit voltage (OCV) from the estimated internal resistance and current IB and voltage VB, and estimates SOC based on the estimated open circuit voltage. It is noted that a method of estimating SOC described above is by way of example and SOC of battery 70 may be estimated by using other known techniques.

SOC determination unit 302 determines whether or not estimated SOC is higher than threshold value SOC(0). It is noted that, for example, when estimated SOC is higher than threshold value SOC(0), SOC determination unit 302 may turn on a discharge request flag. For example, SOC in a case where charge power upper limit Win is lower than a maximum value for charge power resulting from power generation by first MG 20 is set as threshold value SOC(0).

In addition, SOC determination unit 302 determines whether or not estimated SOC is lower than threshold value SOC(1). It is noted that, for example, when estimated SOC is lower than threshold value SOC(1), SOC determination unit 302 may turn on a charge request flag. For example, SOC in a case where charge power upper limit Win is higher than the maximum value for charge power resulting from power generation by first MG 20 is set as threshold value SOC)(1). Threshold value SOC(0) is a value not smaller than threshold value SOC(1).

Setting unit 204 sets target value Net for engine rotation speed Ne with fuel cut control being carried out, when determination unit 202 determines that the IG OFF operation has been performed and vehicle 1 is running.

In the present embodiment, setting unit 204 sets target value Net based on a result of determination by SOC determination unit 302, in addition to vehicle speed V, a lowest rotation speed of engine 10, a rotation speed of engine 10 at which necessary torque can be generated in first MG 20, or the like, which have been discussed in the first embodiment described above.

For example, when SOC of battery 70 is higher than threshold value SOC(0), setting unit 204 sets target value Net within a range of engine rotation speeds Ne which can be taken in the case where the rotation region of first MG 20 is restricted within a discharge region.

For example, when SOC of battery 70 is lower than threshold value SOC(1), setting unit 204 sets target value Net within the range of engine rotation speeds Ne which can be taken in the case where the rotation region of first MG 20 is restricted within a power generation region.

It is noted that, for example, when SOC of battery 70 is equal to or lower than threshold value SOC(0) and equal to or higher than threshold value SOC(1), setting unit 204 sets target value Net with the rotation region being not particularly restricted.

First MG control unit 208 carries out feedback control of first MG 20 such that engine rotation speed Ne attains to target value Net set by setting unit 204. In the present embodiment, for example, when SOC of battery 70 is higher than threshold value SOC(0), first MG control unit 208 controls first MG 20 to cause first MG 20 to operate such that the rotation region thereof is within the discharge region. In addition, for example, when SOC of battery 70 is lower than threshold value SOC(1), first MG control unit 208 controls first MG 20 to cause first MG 20 to operate such that the rotation region thereof is within the power generation region. It is noted that, when SOC of battery 70 is equal to or lower than threshold value SOC(0) and equal to or higher than threshold value SOC(1), first MG control unit 208 controls first MG 20 without particularly being restricted by the rotation region.

In the present embodiment, determination unit 202, setting unit 204, fuel cut control unit 206, first MG control unit 208, and SOC determination unit 302 are each described as functioning as software implemented by execution by a CPU in ECU 200, of a program stored in a memory, however, they may be implemented by hardware. It is noted that such a program is mounted on a vehicle as recorded in a storage medium.

A control structure of a program executed by ECU 200 mounted on vehicle 1 according to the present embodiment will be described with reference to FIG. 8.

Figure 4:
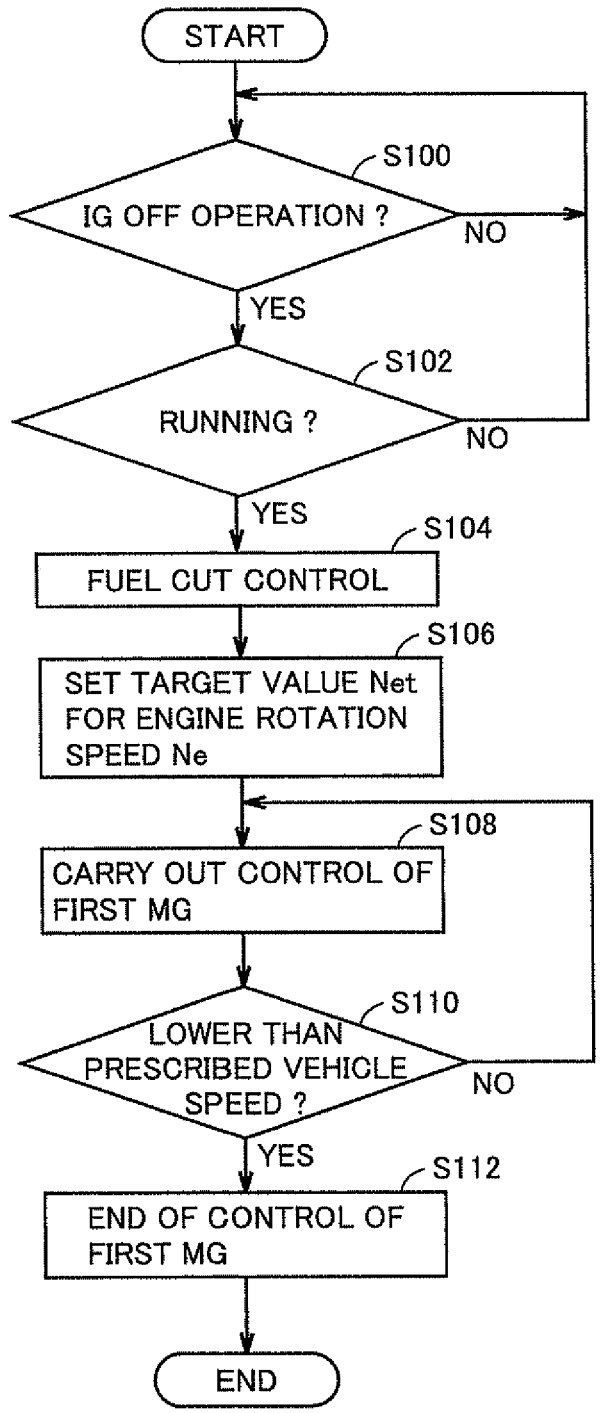
FIG. 4 is a flowchart of a program executed by the ECU mounted on the vehicle according to the first embodiment.
Figure 8:
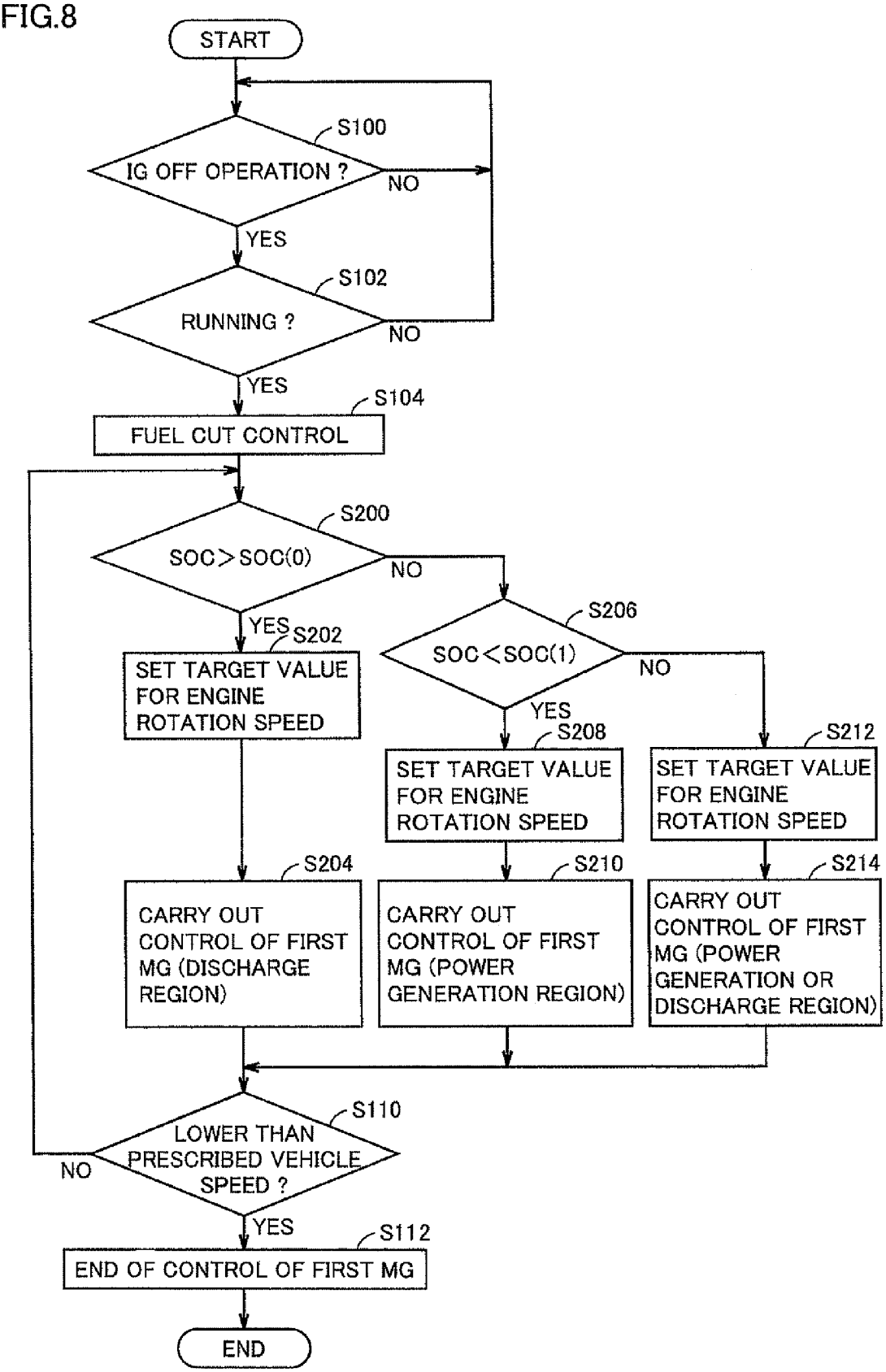
FIG. 8 is a flowchart of a program executed by the ECU mounted on the vehicle according to the second embodiment.

It is noted that processing in the flowchart shown in FIG. 8 the same as that in the flowchart shown in FIG. 4 described previously has the same step number allotted. The processing is also the same. Therefore, detailed description thereof will not be repeated here.

After fuel cut control is carried out in S104, in S200, ECU 200 determines whether or not SOC of battery 70 is higher than threshold value SOC(0). When SOC of battery 70 is higher than threshold value SOC(0) (YES in S200), the process proceeds to S202. Otherwise (NO in S200), the process proceeds to S206.

In S202, ECU 200 sets target value Net within a range of engine rotation speeds Ne which can be taken in the case where the rotation region of first MG 20 is restricted within the discharge region. In S204, ECU 200 controls first MG 20 within the range of the discharge region such that engine rotation speed Ne attains to target value Net.

In S206, ECU 200 determines whether or not SOC of battery 70 is lower than threshold value SOC(1). When SOC of battery 70 is lower than threshold value SOC(1) (YES in S206), the process proceeds to S208. Otherwise (NO in S206), the process proceeds to S212.

In S208, ECU 200 sets target value Net within the range of engine rotation speeds Ne which can be taken in the case where the rotation region of first MG 20 is restricted within the power generation region. In S210, ECU 200 controls first MG 20 within the range of the power generation region such that engine rotation speed Ne attains to target value Net. In S212, ECU 200 sets target value Net. In S214, ECU 200 controls first MG 20 such that engine rotation speed Ne attains to target value Net without the rotation region being restricted.

An operation of ECU 200 mounted on vehicle 1 according to the present embodiment based on the structure and the flowchart as above will be described with reference to the nomographic charts in FIGS. 9 and 10. Since an element showing each axis in the nomographic chart is similar to that in the nomographic chart in FIG. 2, detailed description thereof will not be repeated.

<Case where SOC is Higher than Threshold Value SOC(0)>

Figure 9:
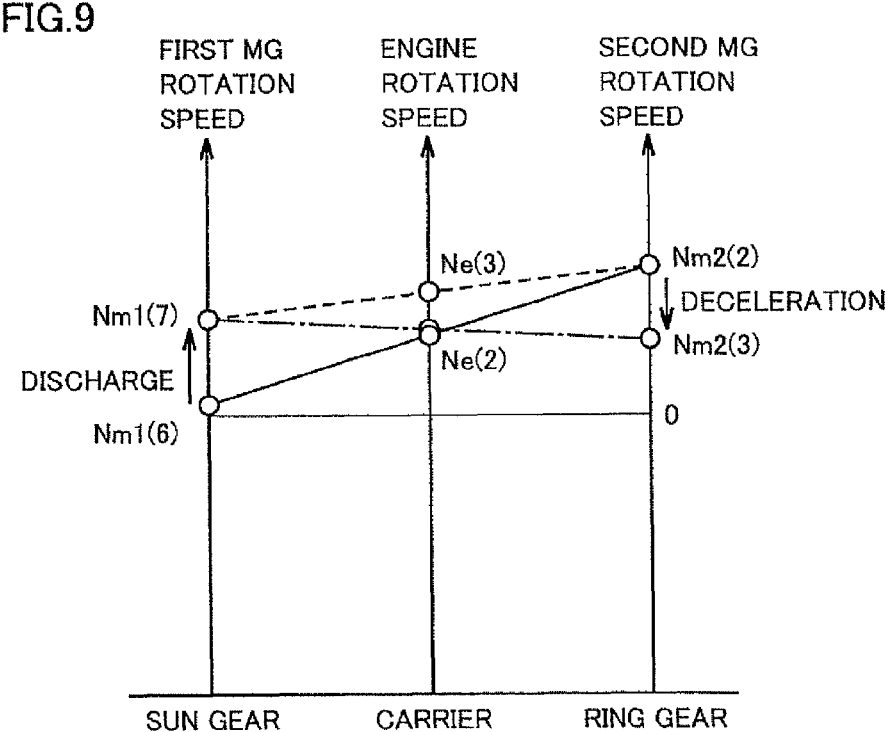
FIG. 9 is a nomographic chart (No. 1) for illustrating an operation of the vehicle in the second embodiment.

As shown with a solid line in FIG. 9, it is assumed that rotation speed Nm1 of first MG 20 is Nm1(6), engine rotation speed Ne is Ne(2), and rotation speed Nm2 of second MG 30 is Nm2(2). It is noted that FIG. 9 is described on the premise that a current rotation speed of first MG 20 is within the discharge region when the rotation region of first MG 20 is restricted to the discharge region.

When the IG OFF operation is performed during running of vehicle 1 at a high speed (YES in S100, YES in S102), fuel cut control is carried out (S104). Then, when SOC of battery 70 is higher than threshold value SOC(0) (YES in S200), target value Net for engine rotation speed Ne is set within a range of engine rotation speeds Ne which can be taken at the time when the rotation region of first MG 20 is restricted within the discharge region (S202). First MG 20 is controlled within the range of the discharge region such that engine rotation speed Ne attains to target value Net (S204).

Therefore, as shown with a dashed line in FIG. 9, first MG 20 is controlled such that rotation speed Nm1 of first MG 20 is raised from Nm1(6) to Nm1(7). Here, torque in the positive rotation direction is generated in first MG 20. Engine rotation speed Ne is raised up to Ne(3) owing to the torque generated in first MG 20. Here, torque in a direction of deceleration of vehicle 1 (the negative rotation direction of second MG 30) is applied to ring gear 56 owing to torque generated in first MG 20 and torque resulting from engine brake of engine 10. Therefore, as shown with alternate long and short dashed lines in FIG. 9, rotation speed Nm2 of second MG 30 is lowered from Nm2(2) to Nm2(3). Namely, vehicle 1 is decelerated. Here, when engine rotation speed Ne has reached target value Net, engine rotation speed Ne is maintained. When vehicle speed V becomes lower than prescribed vehicle speed V(0) (YES in S110), control of first MG 20 ends.

Thus, in making vehicle speed V lower than prescribed vehicle speed V(0), in the region where charging is restricted and where SOC is higher than threshold value SOC(0), vehicle 1 can be decelerated by causing first MG 20 to operate in the discharge region.

<Case where SOC is Lower than Threshold Value SOC(1)>

Figure 10:
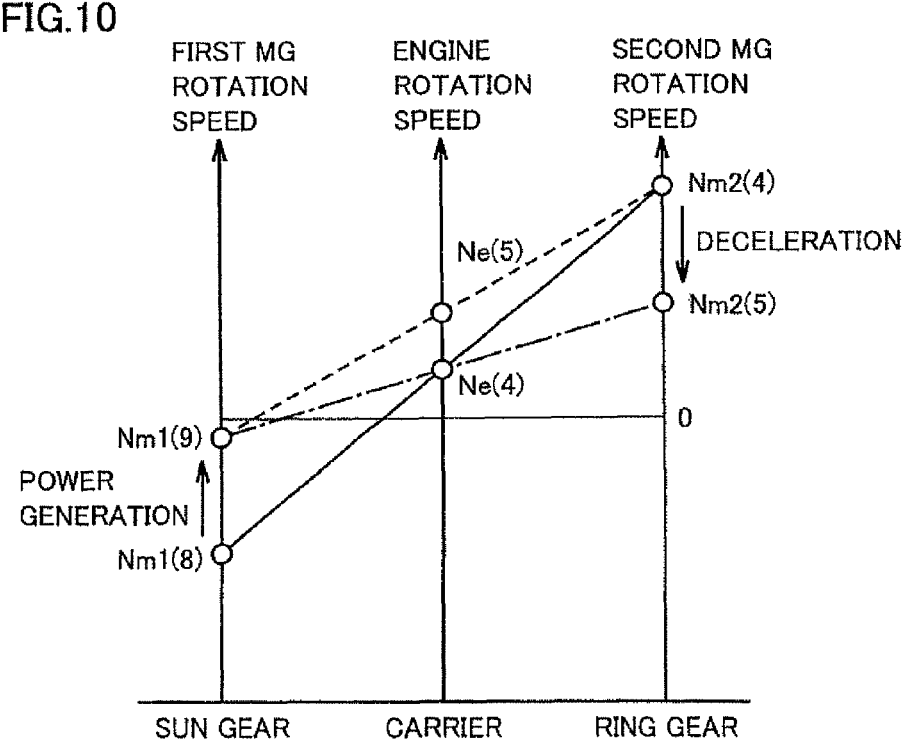
FIG. 10 is a nomographic chart (No. 2) for illustrating an operation of the vehicle in the second embodiment.

As shown with a solid line in FIG. 10, it is assumed that rotation speed Nm1 of first MG 20 is Nm1(8), engine rotation speed Ne is Ne(4), and rotation speed Nm2 of second MG 30 is Nm2(4). It is noted that FIG. 10 is described on the premise that a current rotation speed of first MG 20 is within the power generation region in the case where the rotation region of first MG 20 is restricted to the power generation region.

When the IG OFF operation is performed during running of vehicle 1 at a high speed (YES in S100, YES in S102), fuel cut control is carried out (S104). Then, when SOC of battery 70 is lower than threshold value SOC(1) (NO in S200, YES in S206), target value Net for engine rotation speed Ne is set within the range of engine rotation speeds Ne which can be taken in the case where the rotation region of first MG 20 is restricted within the power generation region (S208). First MG 20 is controlled within the range of the power generation region such that engine rotation speed Ne attains to target value Net (S210).

Therefore, as shown with a dashed line in FIG. 10, first MG 20 is controlled such that rotation speed Nm1 of first MG 20 is raised from Nm1(8) to Nm1(9). Here, torque in the positive rotation direction is generated in first MG 20. Engine rotation speed Ne is raised up to Ne(5) owing to the torque generated in first MG 20. Here, torque in a direction of deceleration of vehicle 1 (the negative rotation direction of second MG 30) is applied to ring gear 56 owing to torque generated in first MG 20 and engine brake torque of engine 10. Therefore, as shown with alternate long and short dashed lines in FIG. 10, rotation speed Nm2 of second MG 30 is lowered from Nm2(4) to Nm2(5). Namely, vehicle 1 is decelerated. When vehicle speed V becomes lower than prescribed vehicle speed V(0) (YES in S110), control of first MG 20 ends.

Thus, in making vehicle speed V lower than prescribed vehicle speed V(0), in the region where charging is allowed and where SOC is higher than threshold value SOC(1), vehicle 1 can be decelerated by causing first MG 20 to operate in the power generation region.

<Case where SOC is Equal to or Lower than Threshold Value SOC(0) and Equal to or Higher than Threshold Value SOC (1)>

When the IG OFF operation is performed during running of vehicle 1 at a high speed (YES in S100, YES in S102), fuel cut control is carried out (S104). Then, when SOC of battery 70 is equal to or lower than threshold value SOC(0) and equal to or higher than threshold value SOC(1) (NO in S200, NO in S206), target value Net for engine rotation speed Ne is set without being restricted by the rotation region of first MG 20 (S212). First MG 20 is controlled such that engine rotation speed Ne attains to target value Net (S214). Since an operation of vehicle 1 in this case is similar to the operation of vehicle 1 described with reference to FIG. 5, detailed description thereof will not be repeated.

Thus, by controlling first MG 20 such that vehicle 1 is decelerated when the IG OFF operation is performed during running of vehicle 1, a rotation speed in the negative rotation direction can be made lower than in the case where rotation speed Nm1 of first MG 20 is not decreased in the case where rotation of engine 10 is stopped. Therefore, first MG 20 or pinion gear 52 entering an overspeed state in the case where the IG OFF operation is performed during running is suppressed.

In addition, by making vehicle speed V lower than prescribed vehicle speed V(0), the rotation speed in the negative rotation direction of first MG 20 becomes lower than in the case where vehicle speed V is equal to or higher than prescribed vehicle speed V(0). Therefore, rotation speed Nm1 of first MG 20 is within the rotation region in which torque necessary for starting engine 10 can be generated.

As above, according to the vehicle in the present embodiment, first MG 20 or pinion gear 52 entering an overspeed state can be suppressed in the case where an IG OFF operation is performed during running and rotation of engine 10 is stopped by decelerating vehicle 1. In addition, also in the case where engine 10 is started from such a state that rotation of engine 10 has stopped, torque necessary for starting engine 10 can be generated in first MG 20. Therefore, engine 10 can be stopped when the IG OFF operation is performed during running, and engine 10 can immediately be re-started when the IG ON operation is performed again. Therefore, a vehicle and a control method for vehicle for controlling an engine to a restartable state in the case where an instruction for stopping the engine is received during running at a high speed can be provided.

In addition, by restricting the rotation region of first MG 20 in accordance with input electric power allowed in battery 70, the engine can be set to a restartable state without imposing burden on battery 70 (that is, without deterioration).

It is noted that, in the case where a restricted rotation region and the current rotation region are different from each other, ECU 200 causes the rotation speed of first MG 20 to move into the restricted rotation region without generating torque in first MG 20. Thereafter, ECU 200 may control first MG 20 such that vehicle 1 is decelerated within the restricted rotation region.

Alternatively, ECU 200 causes the rotation speed of first MG 20 to move into the restricted rotation region while maintaining balance of electric power between first MG 20 and second MG 30 to a zero state. Thereafter, ECU 200 may control first MG 20 such that vehicle 1 is decelerated within the restricted rotation region.

For example, when the current rotation speed of first MG 20 is within the power generation region and when the rotation region of first MG 20 is restricted to be within the discharge region, ECU 200 may decelerate the vehicle speed of vehicle 1, by using brake actuator 152, before it carries out fuel cut control of engine 10.

Alternatively, ECU 200 may control first MG 20 and second MG 30 such that rotation speed Nm1 of first MG 20 is within the range of the discharge region by lowering vehicle speed V, by using torque resulting from engine brake while balance in electric power between first MG 20 and second MG 30 is maintained in a zero state.

Here, ECU 200 may control first MG 20 such that engine rotation speed Ne attains to target value Net by carrying out fuel cut control before rotation speed Nm1 of first MG 20 enters the discharge region (as rotation speed Nm1 of first MG 20 comes closer to the discharge region beyond the threshold value within the power generation region). Alternatively, first MG control unit 208 may control first MG 20 such that engine rotation speed Ne attains to target value Net by carrying out fuel cut control at the time point when rotation speed Nm1 of first MG 20 enters the discharge region.

On the other hand, when the current rotation speed of first MG 20 is within the discharge region and when the rotation region of first MG 20 is restricted within the power generation region, ECU 200 may move the rotation speed of first MG 20 in the negative rotation direction by carrying out fuel cut control before controlling first MG 20.

Alternatively, ECU 200 may control first MG 20 and second MG 30 such that rotation speed Nm1 of first MG 20 is within the range of the power generation region while balance in electric power between first MG 20 and second MG 30 is maintained in the zero state.

Here, ECU 200 may control first MG 20 such that engine rotation speed Ne attains to target value Net by carrying out fuel cut control before rotation speed Nm1 of first MG 20 enters the power generation region (as rotation speed Nm1 of first MG 20 comes closer to the power generation region beyond the threshold value within the discharge region). Alternatively, first MG control unit 208 may control first MG 20 such that engine rotation speed Ne attains to target value Net by carrying out fuel cut control at the time point when rotation speed Nm1 of first MG 20 enters the power generation region.

Though the description has been given in the present embodiment assuming that whether or not input electric power allowed in battery 70 is lower than the first threshold value and whether or not input electric power allowed in battery 70 is higher than the second threshold value are determined based on SOC, the basis is not particularly limited to SOC. For example, battery temperature TB may be used instead of or in addition to SOC, in order to determine whether or not input electric power allowed in battery 70 is lower than the first threshold value and whether or not input electric power allowed in battery 70 is higher than the second threshold value.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 vehicle; 10 engine; 11 engine rotation speed sensor; 12 first resolver; 13 second resolver; 14 wheel speed sensor; 16 drive shaft; 20 first MG; 30 second MG; 40 power split device; 50 sun gear; 52 pinion gear; 54 carrier; 56 ring gear; 58 reduction gear; 70 battery; 80 drive wheel; 102 cylinder; 104 fuel injector; 150 start switch; 151 braking device; 152 brake actuator; 154 disk brake; 156 battery temperature sensor; 158 current sensor; 160 voltage sensor; 200 ECU; 202 determination unit; 204 setting unit; 206 fuel cut control unit; 208 first MG control unit; and 302 SOC determination unit.

The invention claimed is:

1. A vehicle, comprising:
a drive shaft for rotating a drive wheel;
an internal combustion engine;
a first rotating electric machine;
a power transmission device capable of transmitting, by mechanically coupling said drive shaft, an output shaft of said internal combustion engine, and a rotation shaft of said first rotating electric machine as three elements and setting any one of said three elements as a reaction force element, motive power between two other elements;
an input portion for receiving an instruction for stopping a system of the vehicle from a driver; and
a control unit for controlling a braking force application portion such that said vehicle is decelerated when said input portion receives said instruction during running of said vehicle,
said control unit controlling said first rotating electric machine such that rotation of said internal combustion engine in which fuel injection has been stopped does not stop by using said first rotating electric machine until a speed of said vehicle becomes lower than a first speed, and ending control of said first rotating electric machine when the speed of said vehicle becomes lower than said first speed.

2. The vehicle according to claim 1, wherein
said control unit controls said internal combustion engine such that fuel injection in said internal combustion engine is stopped when said input portion receives said instruction during said running of said vehicle and when said internal combustion engine is operating, and controls said first rotating electric machine such that rotation of said internal combustion engine does not stop by using said first rotating electric machine.

3. The vehicle according to claim 2, wherein
said control unit controls said first rotating electric machine such that a rotation speed of said internal combustion engine in which said fuel injection has been stopped attains to a target value.

4. The vehicle according to claim 2, further comprising:
a power storage device for supplying and receiving electric power to and from said first rotating electric machine; and
a detection portion for detecting a state of charge of said power storage device, wherein
said control unit controls said first rotating electric machine such that rotation of said internal combustion engine does not stop by causing said first rotating electric machine to operate within a rotation region in which said first rotating electric machine generates electric power when input electric power allowed in said power storage device is higher than a threshold value.

5. The vehicle according to claim 2, further comprising:
a power storage device for supplying and receiving electric power to and from said first rotating electric machine; and
a detection portion for detecting a state of charge of said power storage device, wherein
said control unit controls said first rotating electric machine such that rotation of said internal combustion engine does not stop by causing said first rotating electric machine to operate within a rotation region in which said first rotating electric machine discharges when input electric power allowed in said power storage device is lower than a threshold value.

6. The vehicle according to claim 2, further comprising a second rotating electric machine having a rotation shaft coupled to said drive shaft, wherein
said control unit controls said first rotating electric machine and said second rotating electric machine such that balance of electric power between said first rotating electric machine and said second rotating electric machine maintains a zero state in controlling said first rotating electric machine such that rotation of said internal combustion engine does not stop by using said first rotating electric machine.

7. The vehicle according to claim 1, further comprising a braking device provided in a motive power transmission path between said drive wheel and said drive shaft, for restricting rotation of said drive wheel, wherein
said control unit controls said braking device such that rotation of said drive wheel is restricted when said input portion receives said instruction during said running of said vehicle.

8. The vehicle according to claim 1, further comprising a second rotating electric machine having a rotation shaft coupled to said drive shaft, wherein
said control unit controls said second rotating electric machine such that said vehicle is decelerated by using said second rotating electric machine when said input portion receives said instruction during said running of said vehicle.

9. The vehicle according to claim 1, wherein
said control unit controls said braking force application portion such that said vehicle is decelerated when a speed of said vehicle is within a predetermined high vehicle-speed region.

10. The vehicle according to claim 1, wherein
said power transmission device is a planetary gear mechanism having a sun gear, a pinion gear, a carrier, and a ring gear,
said sun gear is coupled to said rotation shaft of said first rotating electric machine, said carrier is coupled to said output shaft of said internal combustion engine, and said ring gear is coupled to said drive shaft.

11. A control method for vehicle used for a vehicle including a drive shaft for rotating a drive wheel, an internal combustion engine, a rotating electric machine, and a power transmission device capable of transmitting, by mechanically coupling said drive shaft, an output shaft of said internal combustion engine, and a rotation shaft of said rotating electric machine as three elements and setting any one of said three elements as a reaction force element, motive power between two other elements, comprising the steps of:

determining whether an instruction for stopping a system of said vehicle has been received from a driver;

controlling a braking force application portion such that said vehicle is decelerated when said instruction is received during running of said vehicle; and controlling said rotating electric machine such that rotation of said internal combustion engine in which fuel injection has been stopped does not stop by using said rotating electric machine until a speed of said vehicle becomes lower than a first speed and ending control of said rotating electric machine when the speed of said vehicle becomes lower than said first speed.

\* \* \* \* \*